(12) United States Patent
Hachtel et al.

(10) Patent No.: US 7,262,596 B2
(45) Date of Patent: Aug. 28, 2007

(54) METHOD FOR THE CONTACTLESS DETERMINATION OF A LAYER THICKNESS VIA RESISTANCE AND INDUCTANCE MEASUREMENT OF A SENSOR OIL

(75) Inventors: Hansjoerg Hachtel, Weissach (DE); Stefan Meyer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 10/561,313

(22) PCT Filed: Jun. 23, 2005

(86) PCT No.: PCT/EP2005/052926

§ 371 (c)(1),
(2), (4) Date: Dec. 19, 2005

(87) PCT Pub. No.: WO2006/005673

PCT Pub. Date: Jan. 19, 2006

(65) Prior Publication Data

US 2007/0090833 A1   Apr. 26, 2007

(30) Foreign Application Priority Data

Jul. 15, 2004   (DE) ...................... 10 2004 034 083

(51) Int. Cl.
*G01B 7/06* (2006.01)
*G01R 33/12* (2006.01)

(52) U.S. Cl. ..................................... 324/230; 324/202
(58) Field of Classification Search ................ 324/202, 324/227–230, 225
See application file for complete search history.

(56) References Cited

U.S. PATENT DOCUMENTS

| | | | |
|---|---|---|---|
| 2,809,346 A * | 10/1957 | Archer | 324/229 |
| 4,695,797 A * | 9/1987 | Deutsch et al. | 324/230 |
| 5,206,588 A | 4/1993 | Thorn | |
| 5,416,411 A * | 5/1995 | Elsmore | 324/230 |
| 6,040,694 A | 3/2000 | Becker | |
| 6,198,278 B1 | 3/2001 | Dobler et al. | |
| 6,369,565 B1 | 4/2002 | Dobler et al. | |
| 6,801,044 B2 * | 10/2004 | Kesil et al. | 324/663 |
| 2003/0210042 A1 | 11/2003 | Le | |

FOREIGN PATENT DOCUMENTS

| | | |
|---|---|---|
| DE | 38 15 009 A1 | 11/1989 |
| DE | 196 52 750 A1 | 7/1998 |
| DE | 198 20 546 C1 | 11/1999 |
| WO | 97/23762 | 7/1997 |
| WO | 99/58923 | 11/1999 |

* cited by examiner

*Primary Examiner*—Jay M. Patidar
(74) *Attorney, Agent, or Firm*—Michael J. Striker

(57) ABSTRACT

With a method for the contactless determination of a thickness of a layer (20) made of electrically-conductive material of a component (17), a sensor composed of a coil form (13) and a coil (14) is positioned in the vicinity of the component (17) to be measured. The method is based on a combination of the principles of induction and eddy current. The thickness of the layer (20) is determined using a plurality of measuring and evaluation steps in which the coil (14) is acted upon with a first alternating current frequency f and its inductance and resistance values are evaluated. The distance between the coil form (13) and, therefore, the coil (14), and the component (17) is derived from the resistance value R of the coil (14) acted upon with alternating current frequency f.

7 Claims, 6 Drawing Sheets

$\alpha_1 < \alpha_2 < \alpha_3 < \alpha_4$
$\beta_1 < \beta_2 < \beta_3 < \beta_4$

METHOD FOR THE CONTACTLESS DETERMINATION OF A LAYER THICKNESS VIA RESISTANCE AND INDUCTANCE MEASUREMENT OF A SENSOR OIL

BACKGROUND INFORMATION

The present invention is directed to the method known from DE 196 52 750 C2 for determining a thickness of a layer made of electrically conductive material, in particular a chromium layer. The method is based on a combination of the principles of induction and eddy current. To carry out the measurement procedure, a sensor composed of a coil and a coil form is pressed with the aid of a spring against the surface of a component to be measured. The thickness of the layer is determined using a plurality of measuring and evaluation steps in which an alternating current is applied to the coil and its change in inductance is evaluated. Measurement errors in this procedure caused, e.g., by fluctuations in the material quality of the component, or by differences in the distance between the coil and the component due to contamination or wear can be diminished by introducing a normalized value. An unambiguous pairing of the measured inductance value with the corresponding layer thickness is also ensured as a result.

ADVANTAGES OF THE INVENTION

The method according to the present invention for determining a thickness of a layer made of electrically-conductive material having the features of the independent claim has the advantage that contactless measurement is made possible. As a result, a rapid procedure that has no detrimental effects on the object of measurement is provided. In addition, the risk of damage to a sensor and/or surface is eliminated.

Furthermore, with previous contact measurements, the object of measurement is inserted, with the layer to be investigated, on a resiliently-supported coil form and pressed against it to ensure plane-parallel contact of the object of measurement with the coil form. In so doing, the coil connecting wires leading to the coil are inevitably also moved and can therefore break after repeated measurements due to a high amount of wear. With the contactless measurement procedure according to the present invention, movement of the coil form and, therefore, breakage of the coil connecting wires is prevented.

With a contactless measurement procedure, a non-negligible manufacturing tolerance of the object of measurement can become problematic. When a manufacturing tolerance is not zero, it is possible for the air gap, i.e., the distance between the coil form and, therefore, the coil and the object of measurement, to fluctuate from measurement to measurement. A resultant corruption of the measured results is prevented by the method according to the present invention, so the object of measurement therefore need not be pressed against the coil form in every measurement cycle to prevent the distance from fluctuating.

The method also has all the advantages offered by the method described in the related art. In particular, mass-production coated parts can be inspected in a continuous measurement procedure.

Advantageous further developments and improvements of the method described in the independent claim are made possible as a result of the measures listed in the subclaims and the description.

DRAWING

An exemplary embodiment of the present invention is presented in the drawing and is described in greater detail in the description below.

A schematic design of the measurement device is shown in FIG. 1.

Shown in FIG. 2 is a graph of inductance L of the measuring coil plotted against thickness a of the layer to be determined at different distances and with different material qualities $\alpha$ and $\beta$ of the material located under the layer to be determined.

DETAILED DESCRIPTION OF THE EXEMPLARY EMBODIMENT

Figure 1:
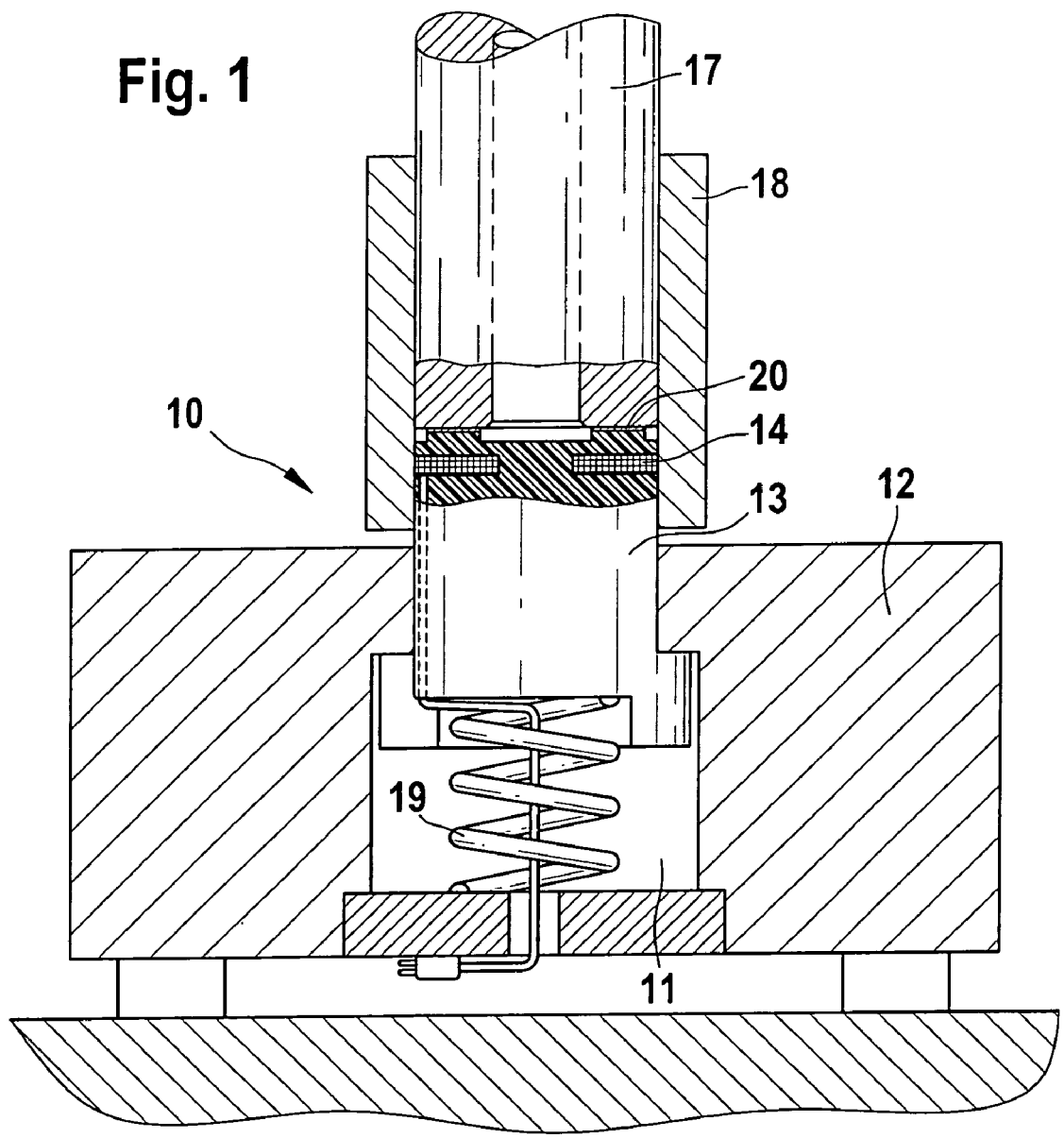

The measurement procedure according to the present invention is based on the "inductance-eddy current measuring principle". A possible device for carrying out the method is made known in DE 196 52 750 C2. The design of a sensor 10 used therefore is shown in FIG. 1. In this depiction, a component 17 is inserted on a coil form 13. In contrast, with the method according to the present invention, a contactless measurement is possible. Sensor 10 is located in recess 11 of a main body 12 and is composed of a coil form 13 on which a coil 14 carrying an alternating current is mounted. Coil 14 can be configured, e.g., as a flat coil or a ring coil. Coil form 13 is preferably composed of an electrically non-conductive and non-ferromagnetic material, e.g., plastic, and is guided nearly frictionlessly into recess 11. Component 17 to be monitored is inserted in a guide body 18 that positions component 17 and coil 14 relative to each other. With the aid of a spring 19, coil form 13 and, therefore, coil 14 are pressed against the surface of component 17. The surface has the layer to be determined. Component 17 can be, e.g., the neck of an injection valve, and layer 20 can be a chromium layer. When an alternating current flows through coil 14, an alternating magnetic field is produced that penetrates the chromium layer and the material layer under it, which is composed of the ferromagnetic material of component 17. In the chromium layer, only the eddy-current effect takes place, while the inductance and eddy-current effect takes place in the ferromagnetic material of component 17. The particular measurement effects that would occur if the other part were not present are described individually below. If an alternating current flows through coil 14 and the alternating magnetic field of coil 14 only meets an electrically highly-conductive but non-ferromagnetic material, i.e., if only the chromium layer were contacted by the alternating magnetic field of coil 14, then only the "eddy-current effect" takes place. The inductance of coil 14 is reduced due to the eddy currents that form in the electrically highly-conductive but non-ferromagnetic material.

Figure 2:
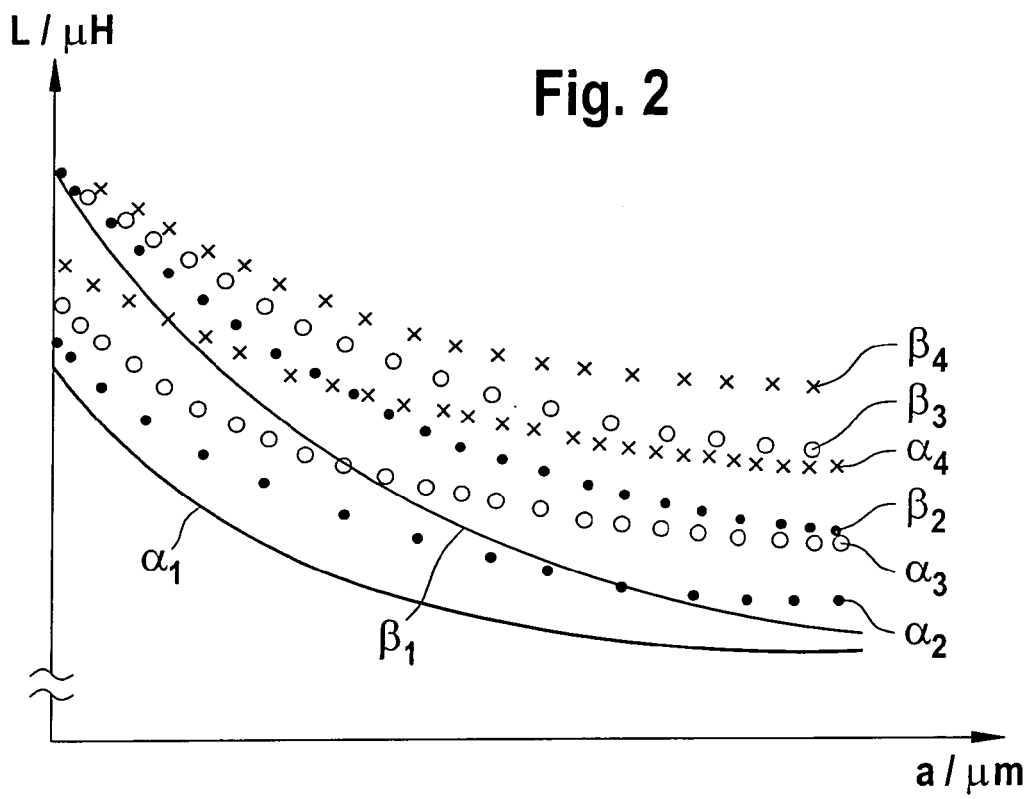

The effect of the magnetic field of a coil 14 carrying an alternating current on the ferromagnetic material diametrically opposed to it, i.e., on the material of component 17, will now be described below. The alternating magnetic field of coil 14 carrying the alternating current contacts the material of component 17. It should be noted that, with electrically conductive and ferromagnetic material, both the ferromagnetic effect and the eddy-current effect take place. While the eddy-current effect results in a reduction in inductance of measuring coil 14, the ferromagnetic effect—which is also referred to as the inductance effect in this publication—brings about an increase in the inductance of measuring coil 14. Which of the two effects prevails depends primarily on the frequency of the alternating current that flows through coil 14, and on the material quality of component 17. If these two measuring effects are transferred to component 17 with the chromium layer, it can be determined that, the thicker the chromium layer is, the weaker the formation of the magnetic field is and, therefore, the weaker the inductance of coil 14 is. In FIG. 2, $\alpha 1$ is a measurement curve that represents the decrease in inductance in measuring coil 14 as thickness a of the chromium layer increases.

Figure 3:
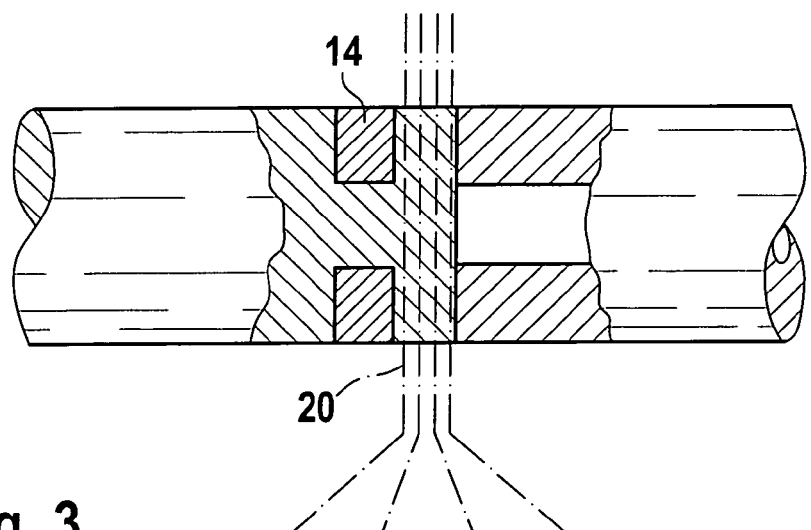
FIG. 3 shows the relationship of the different distances between the measuring coil and the object of measurement used in FIG. 2.

The shape of the measurement curve of inductance L plotted against layer thickness a depends on the material quality of component 17, however. That is, e.g., on the electrical resistance, the permeability of the material, and the distance between coil form 13 and/or coil 14 and the surface to be measured. If the distance between measuring coil 14 and the chromium layer changes, e.g., due to contamination or wear of coil form 13, different characteristic curves of the graph of inductance L versus layer thickness a result. Various examples are shown in FIG. 2. Characteristic curves $\alpha 1$, $\alpha 2$, $\alpha 3$ and $\alpha 4$ represent the graph of inductance L plotted against layer thickness a given different distances between measuring coil 14 and the chromium layer to be monitored, with the material quality of component 17 remaining the same. FIG. 3 shows the size of distance a between coil 14 and the chromium layer to be monitored. It is obvious that the distance becomes increasingly great from $\alpha 1$ to $\alpha 4$. Characteristic curves $\beta 1$ through $\beta 4$ represent a variation in the distance between the measuring coil and the chromium layer to be monitored given a second material quality of component 17. Based on the diagram shown in FIG. 2, it is obvious that a large number of possible layer thicknesses can be paired with a measured inductance value L.

From the related art it is known to normalize the inductance values that were determined, the normalization resulting in a measured value that can be unequivocally assigned and largely eliminates the measurement errors described above. A total of three measurements are carried out for this purpose: A premeasurement and post-measurement with the object of measurement, and a measurement for normalization purposes carried out exclusively with respect to a layer made of the electrically conductive material. The measurement carried out for normalization purposes need not be carried out for every example. Instead, it is sufficient, in principle, to carry out a measurement for normalization purposes only when the sensor is replaced and, if necessary, to synchronize the measurement systems over a period of intervals.

The method according to the present invention now also makes it possible to perform a contactless measurement. A fundamental problem associated with a contactless measurement procedure is the fluctuation in the distance between coil form 13 and, therefore, coil 14, and the object of measurement. In this publication, the distance between coil form 13 and the object of measurement is also referred to as the "distance" or "air gap". The manufacturing tolerance of the component, as the object of measurement, that differs from zero, contributes to the distance fluctuation. In practice, the manufacturing tolerance is, e.g., 0.2 mm for the neck of injection valves. Assuming the measurement system has a minimum tolerance of 0.1 mm, the distance, i.e., the air gap between coil form 13 and component 17, can vary from one item to the next by 0.1 mm to 0.3 mm. The minimum distance in this case is therefore 0.1 mm and the maximum distance is 0.3 mm. If the method is carried out to perform a contactless determination of a layer thickness using the measurement and evaluation steps known from the related art, the distance fluctuations experienced above can make the measurement accuracy only slightly worse, given favorable measuring conditions. However, the measurement performed for normalization purposes must be carried out in addition for every measurement, including the premeasurement and post-measurement. The explanation of the resistance and inductance measuring method described below serves to demonstrate how the layer thickness can be determined with sufficient accuracy despite a fluctuating air gap without having to position a calibration part on the sensor in every measuring cycle and carry out a measurement for normalization purposes. Instead of using only inductance values of sensor coil 14 to determine a layer thickness, as described in the previous related art, it is provided to also measure and evaluate its resistance value.

The method according to the present invention for determining the thickness of a layer is carried out using a plurality of measuring and evaluation steps, as known from the related art. Before component 17 is coated, an inductance value $L_{0,d,f}$ of coil 14 is determined in a "premeasurement". In this case, the first index "0" of the inductance value $L_{0,d,f1}$ refers to the thickness of the coating (0=uncoated), the second index "d" is the actual value of the distance between coil form 13 and component 17 (d has not yet been determined), and, finally, the third index "f" is the alternating-current frequency f with which coil 14 is acted upon (f is adjusted). During measurement, coil 14 is directed toward the uncoated surface (measuring surface) of component 17 facing coil 14, a distance d forming between coil form 13 and the surface of component 17. The exact value d of the distance is not known at this time and must therefore be determined. A measurement is carried out exclusively with respect to the material of uncoated component 17. Alternating-current frequency f applied to coil 14 is a frequency from the high-frequency range. A suitable value is, e.g., 4 MHz. The magnitude of inductance value $L_{0,d,f}$ also depends on the condition of component 17, in particular its magnetic and electrical properties. The condition of component 17 can fluctuate in series production. For this reason, inductance value $L_{0,d,f}$ must be determined at the beginning of the measuring procedure for every individual component 17 and stored in a data memory in an allocatable manner.

Figure 4:
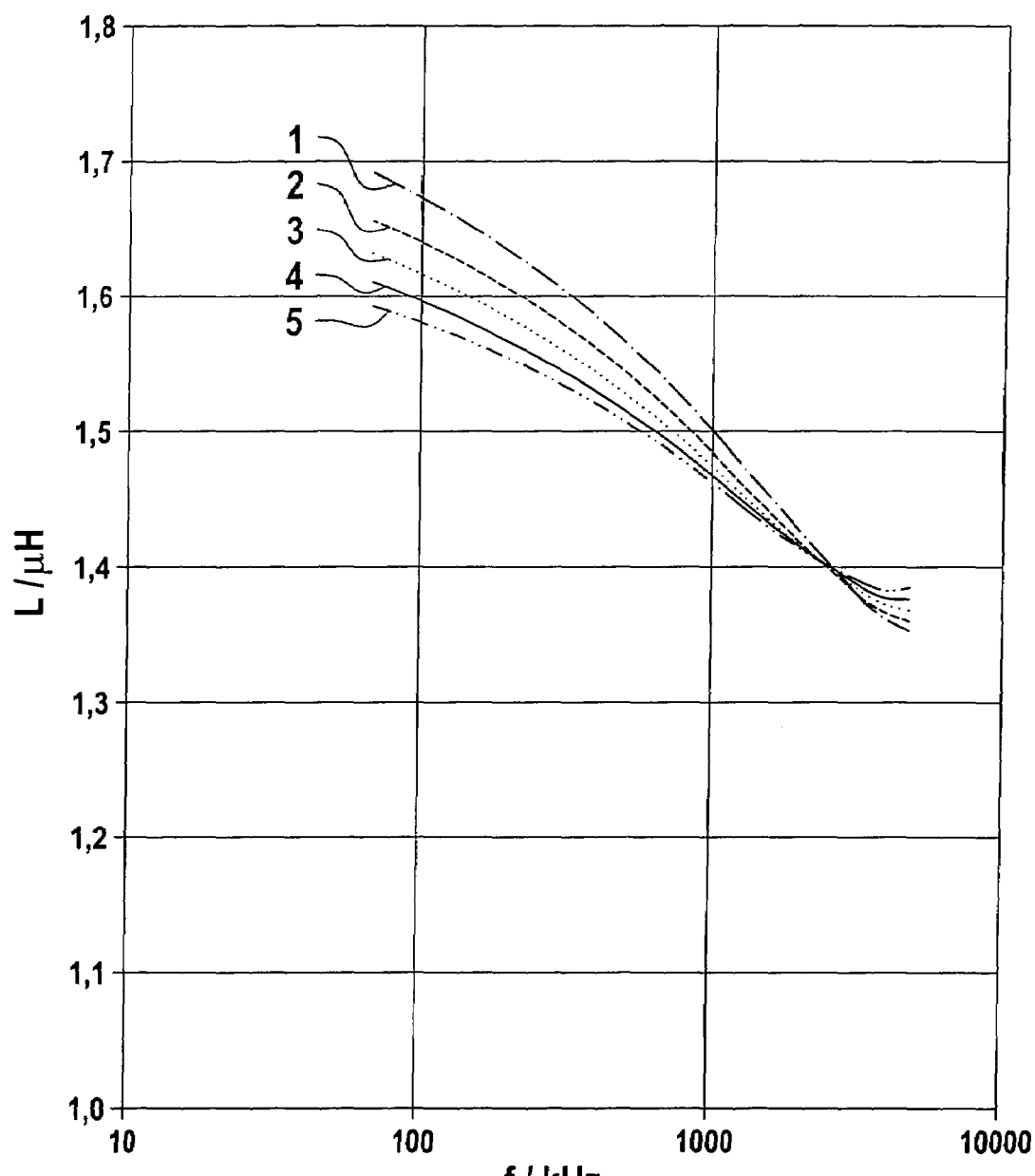
FIG. 4 is a graph of coil inductance L as a function of frequency used, given different air gaps (distance between the coil form and the uncoated object of measurement).

The premeasurement of coil inductance serves to determine a normalized value. In addition, a further measurement must be carried out in a contactless determination of layer thickness a so that distance d between coil form 13 and component 17 can be determined. This further measurement can be carried out via an additional inductance measurement of coil 14, coil 14 being acted upon with a second alternating-current frequency f2 that is different from the first one. The coil inductance that is determined as a result can be converted to a distance value d by determining a characteristic value and using a previously-registered characteristic curve. As shown in the diagram in FIG. 4, however, using this method for a certain range in the frequency spectrum cannot yield a unique result. In this diagram, the measured inductance values of coil 14 are plotted as a function of alternating-current frequency f2 used, the inductance values being obtained in measurements of uncoated components 17. Curve 1 was graphed at a distance d=0 mm, i.e., coil form 13 was placed on component 17 without an air gap in-between. In subsequent curves 2, 3, 4 and 5, the distance is decreased by 0.1 mm each time. At a low alternating-current frequency f2, e.g., at 100 kHz in FIG. 4, the inductance value is greatest when coil form 13 is placed on component 17. The further coil 14 is from component 17, the smaller the values become. Given high alternating-current frequencies f2, e.g., 5 MHz in FIG. 4, the behavior is exactly the opposite. There is a frequency range in-between, approximately 3 to 4 MHz in this example, in which the distance changes result in inductance values of coil 14 that are nearly identical. A reliable distance determination can therefore not be carried out with these alternating-current frequencies. Alternating-current frequency f2 should therefore preferably be a frequency from the low-frequency range, e.g., 100 kHz. It should be noted that the frequency range in which the distance changes result in nearly-identical inductance values of coil 14 depends on the basic material of component 17 and the coil form.

Figure 5:
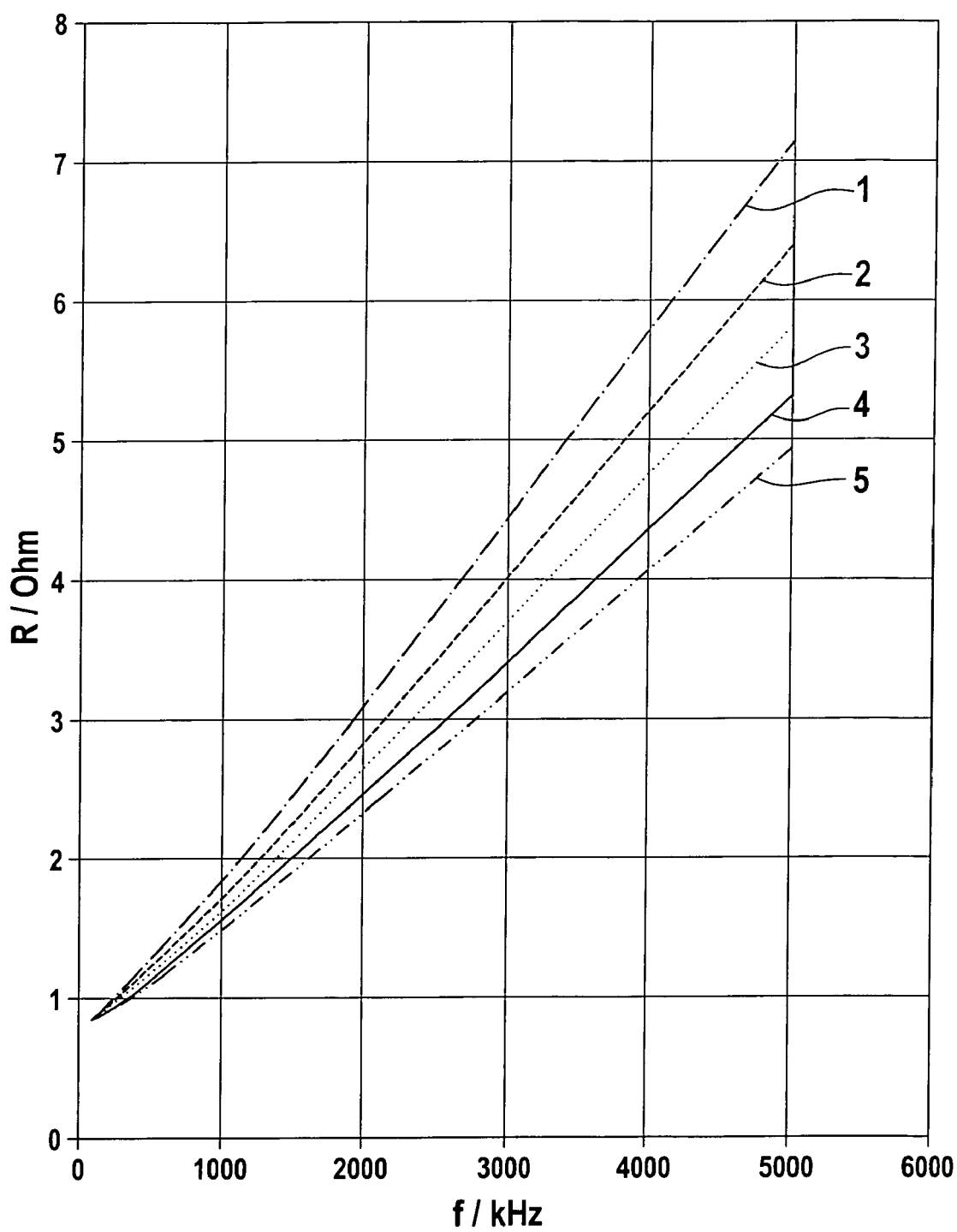
FIG. 5 is a graph of coil resistance R as a function of frequency used, given different air gaps (distance between the coil form and the uncoated object of measurement).
Figure 6:
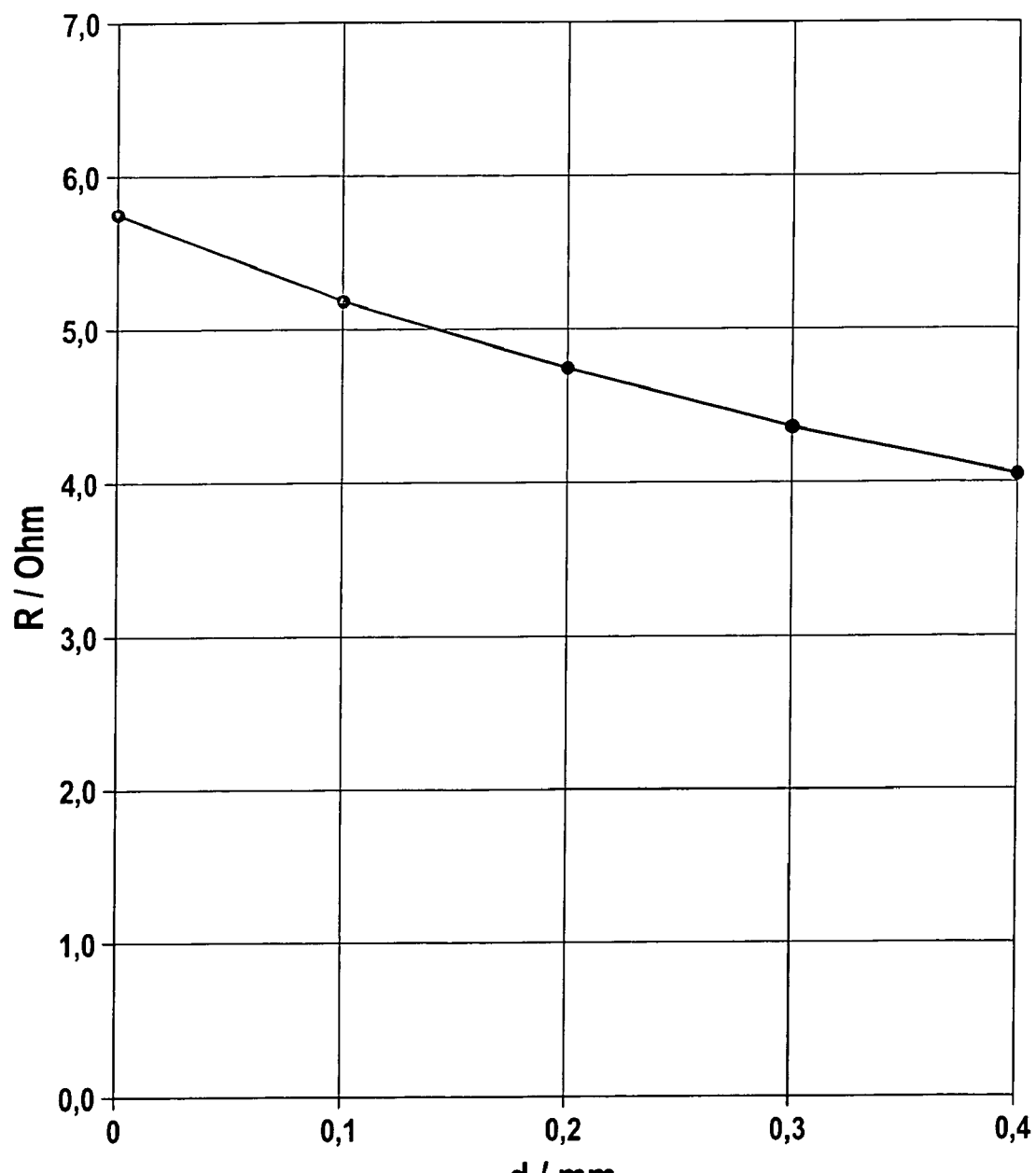
FIG. 6 shows a distance characteristic with which a resistance value R can be converted to a distance value d.

Instead of carrying out a further inductance measurement of coil 14 to determine distance, it is provided in the method according to the present invention to measure alternating-current resistance value R of coil 14. As in FIG. 4, curve 1 in FIG. 5 represents the result measured at a distance d=0 mm, and further curves 2, 3, 4 and 5 represent the results measured when the distance is increased by 0.1 mm each time. Curves 1 through 5 in FIG. 5 are the graphs of resistance value R of coil 14 obtained in measurements of uncoated components 17. Even in the MHz range of alternating-current frequency f2 used, resistance values R of coil 14 exhibit adequate sensitivity, i.e., it is possible to reliably derive distance d from measured resistance value R. If resistance value R is plotted against distance d—coil 14 being having been acted upon with an alternating-current frequency of f=4 MHz—a distinct characteristic curve is obtained, as shown in FIG. 6. Advantageously, the premeasurement of coil inductance to determine the normalized value and the resistance measurement to determine distance are carried out practically simultaneously, since modern measuring devices register both variables together when a coil measurement is carried out.

A distance value d is derived from the measurement of resistance value R of coil 14 with the aid of the previously-registered characteristic curve, as shown in FIG. 6, and it is stored.

A layer of chromium is now applied to component 17 using an appropriate coating system. A third measurement is then carried out, i.e., a "post-measurement", which is carried out at the same point on component 17 where the premeasurements mentioned above were carried out. The measuring device must be designed such that distance d is equally great in the premeasurement and post-measurement. The result is an inductance value $L_{x,d,f}$ of measuring coil 14, the first index "x" standing for the value of layer thickness a to be determined, the second index "d" standing for the distance between coil form 13 and coated component 17, and the third index "f" standing for alternating-current frequency f applied to coil 14. The pre-and post-measurements are carried out at the same frequency f, e.g., 4 MHz. The magnitude of inductance value $L_{x,d,f}$ is determined, among other things, by the thickness of the chromium layer and the material quality of component 17. It should be ensured that both inductance values $L_{0,d,f}$ and $L_{x,d,f}$ that were determined are each allocated to the same component 17 in an unambiguous manner.

These two inductance values $L_{0,d,f}$ and $L_{x,d,f}$ are now converted via an algorithm to a normalized value, i.e., a dimensionless characteristic number that can be allocated to a corresponding layer thickness a. This normalized value is referred to as measured value $M_e$ in this case. In order to carry out this determination of the normalized value, inductance values $L_{\infty,AB,f}$ and $L_{0,AB,f}$ must be determined, and these values must have been previously measured and stored. Inductance value $L_{\infty,AB,f1}$ is obtained when a measurement carried out exclusively with respect to a chromium layer is carried out on an object of measurement; the value of distance d between coil form 13 and the object of measurement is AB. The surface of the object of measurement must have a layer of chromium that is so thick that it shields practically the entire magnetic field of coil 14, so that neither the inductance effect nor the eddy-current effect can take place in the material of the object of measurement. An electrically conductive but non-ferromagnetic substance could be used instead of chromium on the object of measurement.

Inductance value $L_{0,AB,f}$ is obtained when a measurement is carried out exclusively with respect to an object of measurement made of ferromagnetic material; the value of distance d between coil form 13 and the object of measurement is AB. High-frequency alternating-current frequency f1 is used for both inductance values $L_{\infty,AB,f}$ and $L_{0,AB,f}$. The normalized value, or measured value $M_e$, is now determined using equation

1:

$$M_e = B \cdot \frac{L_{x,d,f} - L_{0,d,f}}{L_{\infty,AB,f} - L_{0,AB,f}}, \quad (1)$$

Figure 7:
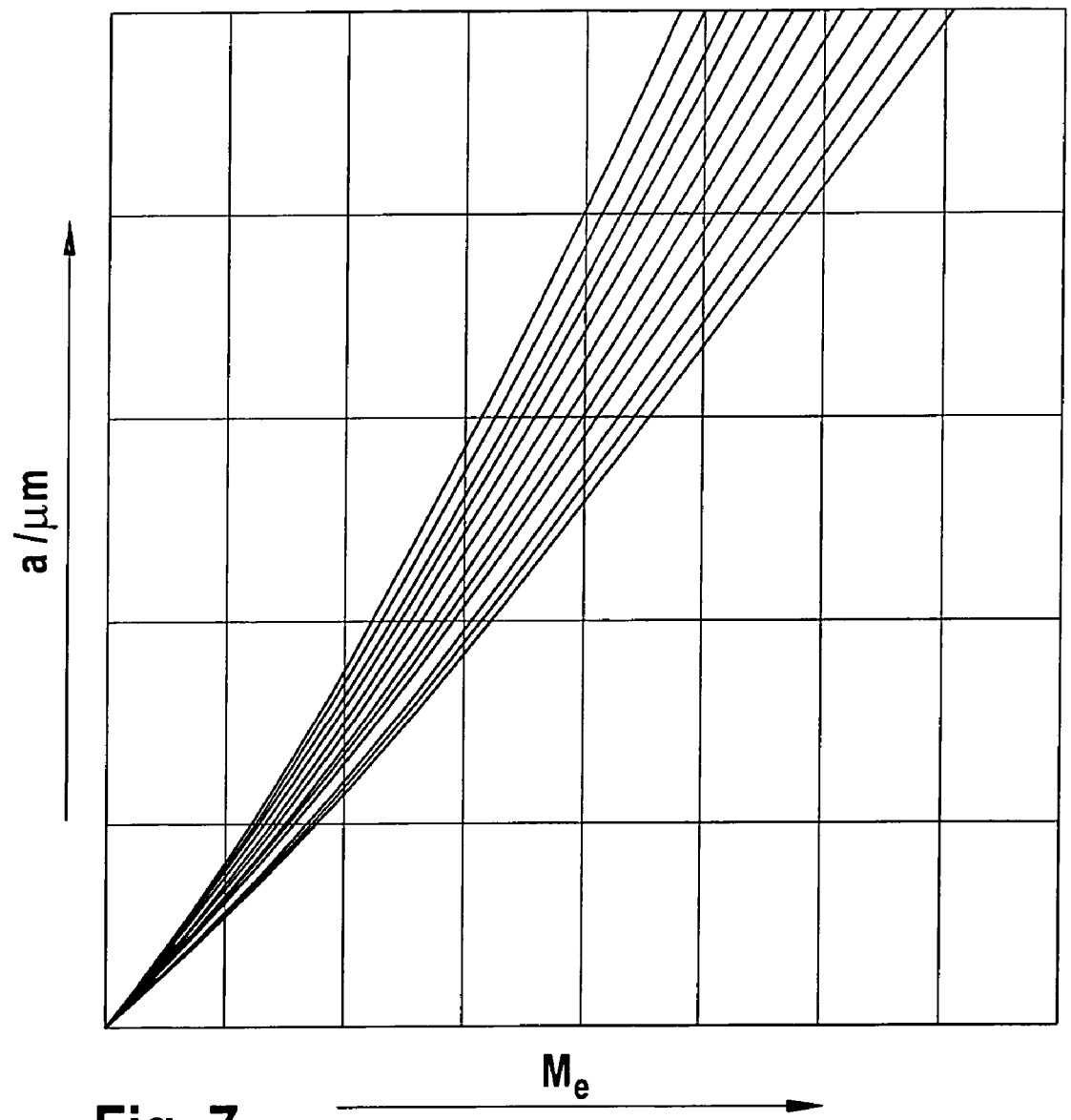
FIG. 7 shows a family of calibration curves with a plurality of calibration curves, each one representing a concrete, unique distance d.

In which
$L_{x,d,f}$=inductance value determined in the post-measurement
$L_{0,d,f}$=inductance value determined in the premeasurement
$L_{\infty,AB,f}$=inductance value of coil 14 determined in a measurement carried out exclusively with respect to an object of measurement made of the electrically conductive material; the value of distance between the coil form 13 and the object of measurement is AB
$L_{0,AB,f}$=inductance value of coil 14 determined in a measurement carried out exclusively with respect to an object of measurement made of the ferromagnetic material; the value of the distance between coil form 13 and the object of measurement is AB
B=constant factor Constant factor B can be any positive number. For practical purposes, B is a multiple of 10, e.g., 1000. The value that is half of the sum of the minimum and maximum distance between coil form 13 and the object of measurement can be selected as a possible value AB representing distance d between coil body 13 and the object of measurement. A typical value used in practical applications is AB=0.2 mm. With these concrete values for constant factor B and AB, and the measured inductance values—in contrast to the previous measuring method with only one calibration curve from the related art—a plurality of calibration curves is registered based on equation (1), each of which stands for a concrete, unique distance d. The distance serves as the parameter. The, e.g., twelve calibration curves in entirety represents a family of calibration curves, as shown in FIG. 7. Each of the individual calibration curves represents a certain distance value and shows, for this distance value, the shape of the graph of layer thickness a over a range of normalized values. In converting measured value $M_e$ to a layer thickness value a, the calibration curve that is selected is the one with a distance parameter value having the least deviation from the determined value of distance d, of course. In the ideal case, the least deviation is zero.

This measuring procedure can be used when the electrical and magnetic properties of parts—for example purposes—to be measured are sufficiently constant. It is recommended that this constancy be checked.

With inductive alternating current-layer thickness measurements, the measuring system must be designed such that the measured signal is not corrupted by inductive or capacitive coupling impedances if it is contacted or changed via electromagnetic in-coupling (the grounding issue must be taken into consideration). Whether or not a relevant contact measurement error occurs depends on the design of the measuring system and the carrier frequency. The following tends to apply: The higher the carrier frequency, the greater the risk that contact errors will occur. (These interrelationships also apply for the measuring methods described in DE 196 52 750 C2 and in other patents based on the same basic physical principle).

The following should be pointed out: Measurement errors can be caused not only by direct contact of the measuring devices and the sensors, but also by indirect contact. An example of indirect contact is: The supply cables from the measuring device to the sensor are located on or in the vicinity of a metal plate. If this metal plate is contacted, this can result in measurement errors, even if the point of contact is relatively far away from the cable positions. The occurrence of measurement errors of this type must be prevented using known methods, if applicable.

What is claimed is:

1. A method for the contactless determination of a thickness of a layer (20) made of electrically-conductive material applied to a component (17) made of ferromagnetic material, the following measuring steps including at least one measuring coil (14) carrying an alternating current and mounted on a coil form (13), the inductance and resistance values of which are evaluated:
   Determine the inductance value $L_{0,d,f}$ of the coil (14) in a measurement carried out exclusively with respect to a component (17) as the object of measurement made of ferromagnetic material, the coil (14) being acted upon with an alternating current frequency f; the distance between the coil form (13) and the object of measurement is d;
   Determine the resistance value $R_{0,d,f}$ of the coil (14) in a measurement carried out exclusively with respect to the component (17) as the object of measurement made of ferromagnetic material, the coil (14) being acted upon with alternating current frequency f; the distance between the coil form (13) and the object of measurement is d;
   Convert the resistance value $R_{0,d,f}$ with a distance characteristic into the value of distance d;
   Determine the inductance value $L_{x,d,f}$ of the coil (14) in a measurement carried out with respect to the layer (20) to be determined, the coil (14) being acted upon with alternating current frequency f; the distance between the coil form (13) and the coated component (17) is d;
   Convert the determined inductance values $L_{0,d,f}$ and $L_{x,d,f}$ to a dimensionless measured value $M_e$;
   Convert the measured value $M_e$ with a family of calibration curves with consideration for the determined value of distance d to a layer thickness value.

2. The method as recited in claim 1, wherein
the dimensionless measured value $M_e$ is determined using equation (1):

$$M_e = B \cdot \frac{L_{x,d,f} - L_{0,d,f}}{L_{\infty,AB,f} - L_{0,AB,f}}, \qquad (1)$$

In which
$L_{x,d,f}$=inductance value determined in the post-measurement
$L_{0,d,f}$=inductance value determined in the premeasurement
$L_{\infty,AB,f}$=inductance value of the coil (14) determined in a measurement carried out exclusively with respect to an object of measurement made of the electrically-conductive material; the value of distance d between the coil form (13) and the object of measurement is AB
$L_{0,AB,f}$=inductance value of the coil (14) determined in a measurement carried out exclusively with respect to an object of measurement made of the ferromagnetic material; the value of distance d between the coil form (13) and the object of measurement is AB
B=constant factor.

3. The method as recited in claim 2, wherein
factor B is 1000.

4. The method as recited in claim 2, wherein
the value AB of the distance d that is selected is half the sum of the minimum and maximum distance between the coil form (13) and the object of measurement.

5. The method as recited in claim 1, wherein
alternating current frequency f is a frequency from the high-frequency range.

6. The method as recited in claim 1, wherein
the family of calibration curves includes a plurality of calibration curves, each of which represents a concrete, unique distance d.

7. The method as recited in claim 6, wherein
from the family of calibration curves, a calibration curve is selected to convert measured value $M_e$ to a layer thickness value a, the distance parameter value of which has the smallest deviation from the determined distance d.

* * * * *